Feb. 15, 1938.  P. DUNSHEATH  2,108,529
METAL EXTRUSION DEVICE
Filed Sept. 10, 1935   2 Sheets—Sheet 1
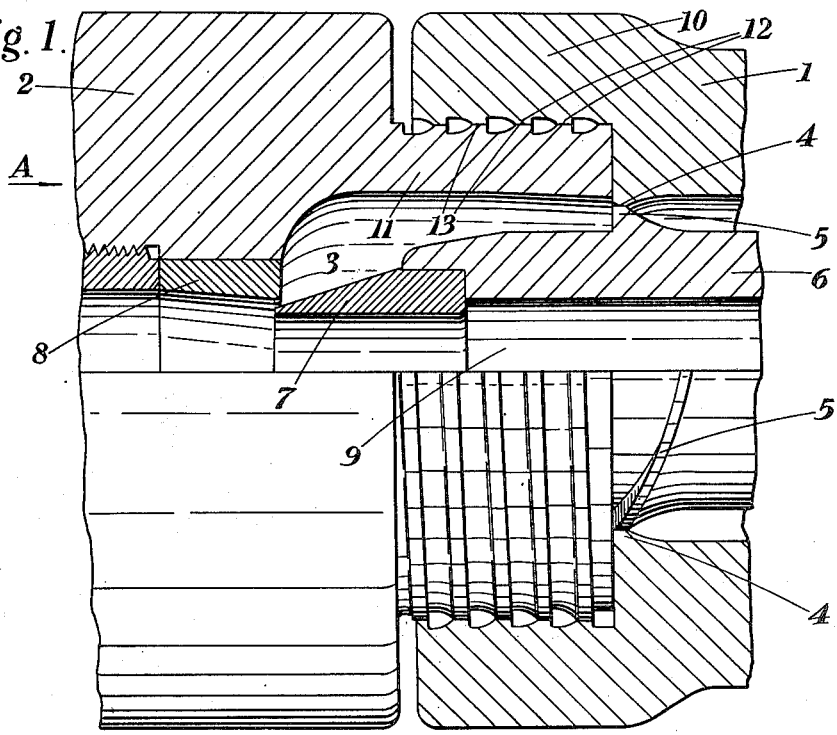
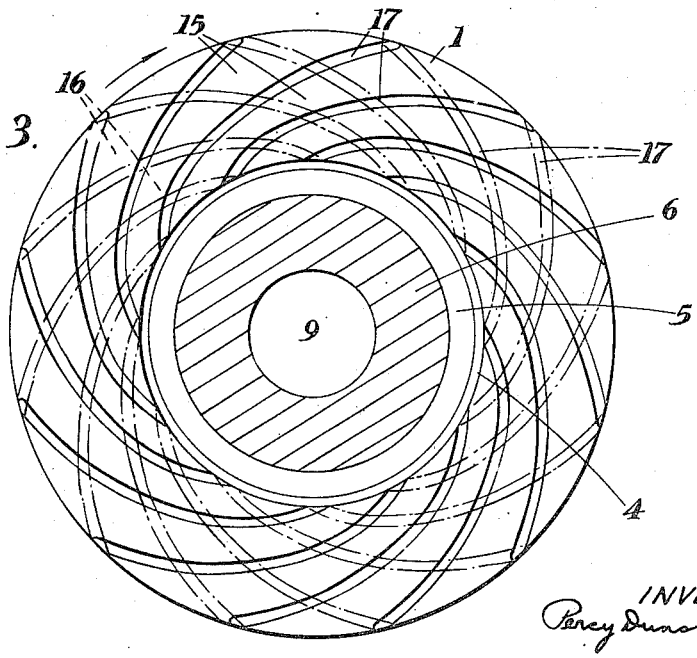
INVENTOR
Percy Dunsheath
BY
Byrnes, Stebbins & Blenko
his ATTORNEYS Feb. 15, 1938.  P. DUNSHEATH  2,108,529
METAL EXTRUSION DEVICE
Filed Sept. 10, 1935  2 Sheets—Sheet 2
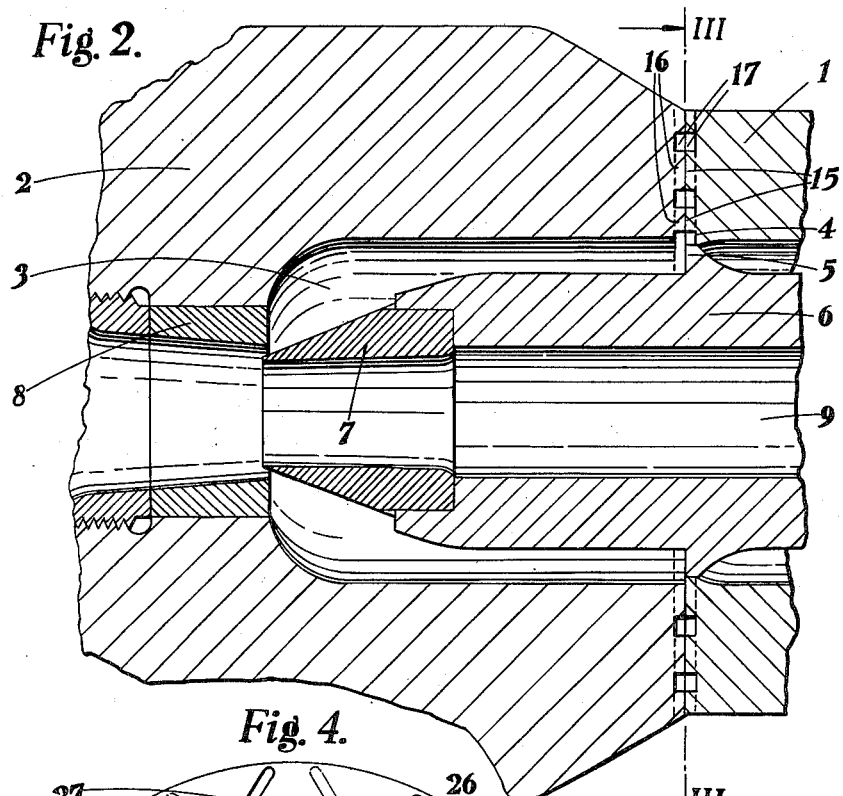
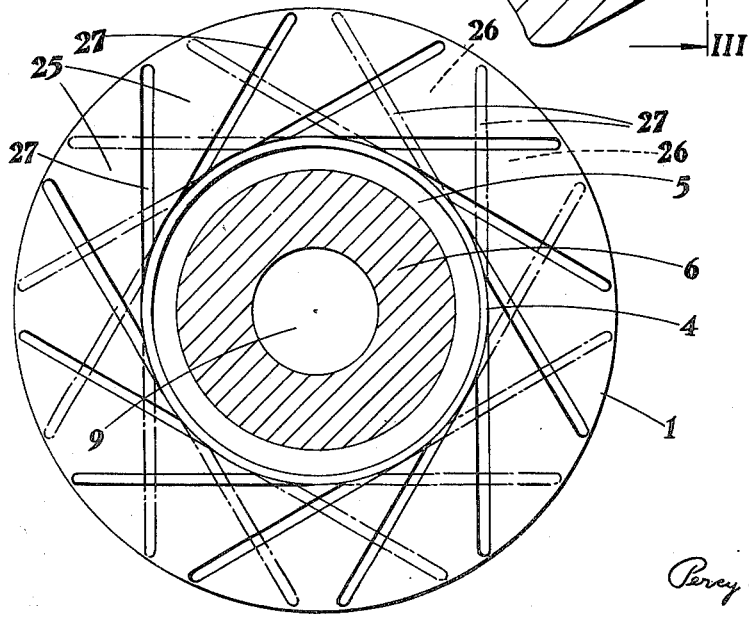
INVENTOR
Percy Dunsheath
BY
Byrnes, Stebbins & Blake
his ATTORNEYS Patented Feb. 15, 1938

2,108,529

UNITED STATES PATENT OFFICE 2,108,529

METAL EXTRUSION DEVICE

Percy Dunsheath, Kent, England, assignor to W. T. Henley's Telegraph Works Company Limited, London, England, a British company Application September 10, 1935, Serial No. 39,932
In Great Britain September 29, 1934

10 Claims. (Cl. 207—2)

This invention is concerned with metal extrusion machines of the kind in which metal in a highly viscous or in a plastic state is impelled through a chamber and thence extruded through a die or between an inner and outer die. In machines of this type (of which an example is described in United States patent application Serial No. 656,498) a wall of the chamber is formed wholly or in part by two relatively rotating members which make with each other a running joint. Such a joint is usually present near the delivery end of the impelling device and is therefore subject to a very high pressure which tends to force plastic metal between the joint surfaces and out of the chamber. The present invention deals with the construction of such running joints.

In providing, in accordance with the present invention, an improved joint in such a position, we do not attempt to make the joint tight by reason of the close fit of the two parts but we provide these parts with a device for continuously exerting, during the relative movement of the two members, a counter pressure back towards the chamber on plastic metal at the entrance to the running joint. The counter pressure is built up by the action of the device on a body of plastic metal which, under steady operating conditions, should exist between the two members. Such body is prevented from escape by the device and serves to resist the entry of further metal into the space between the surfaces.

The device comprises one or more ribs on the rotating member each having an impelling surface lying transversely of the joint surface and extending in a direction inclined at an acute angle to the direction of relative movement of the two members and, cooperating therewith, ribs or other projections on the stationary member, or vice versa, so as to produce a pressure in the desired direction. In cases where the joint is between cylindrical surfaces or between circular members of other form, for instance, between concentric conical surfaced members, the rib (or ribs) carrying the inclined surface may extend continuously in a helical direction and be in the form of a single or multi-start screw thread. Where the joint is between plane surfaces the rib (or each rib) carrying the inclined impelling or pressure building surface may form a flat spiral or an approximation thereto, and be formed by cutting grooves of appropriate section in the face of the member. Since, in addition to providing a pressure-tight joint, the adjacent joint surfaces may also have to act as a bearing or locating or guiding arrangement, it will generally be desirable to provide the ribs carrying the inclined impelling surfaces with comparatively broad faces and to provide cooperating surfaces on the ribs or other projections on the other body. It will further be desirable to make the clearance between these surfaces no greater than is necessary for free running of the moving part. The thread or other rib, on the first member, carrying the inclined impelling surface may be of rectangular section and of relatively small pitch, for instance, in the case of a joint between cylindrical surfaces, a screw thread which makes an angle of 80° or more with a line parallel with the axis may be employed. We prefer to employ on the second member a rib similar to the rib on the first member but of opposite hand, but other forms of projections may be employed here. The depth of the rib will be large in comparison with the clearance between the two members so that the backward drive provided by the engagement of the metal with the inclined impelling surface of the rib may be large in comparison with the forward leakage through the clearance space.

In the accompanying drawings there are shown, by way of example only, several forms of pressure resistant joint constructed in accordance with the present invention and applied to extrusion machines of the kind in which metal in a plastic state is extruded by the propelling action of a rotating screw-threaded cylinder co-operating with an inner stationary concentric member, as described in the specification of patent application Serial No. 656,498.

In the drawings:

Figure 1 is an elevation, partly in section, of the portion of extrusion machine to which a pressure resistant joint of cylindrical form is fitted, Figure 2 is a fragmentary sectional elevation of a similar machine fitted with a pressure resistant joint between two annular surfaces lying in a plane radial to the axis of the machine, Figure 3 is a cross-sectional view taken on the line III—III in Figure 2 of the apparatus shown therein and Figure 4 is a view similar to that in Figure 3 showing a joint with a modified form of counter-pressure building arrangement.

Referring firstly to Figures 1 and 2 only of the drawings, it is explained that the rotating screw threaded cylinder 1, of which only part is shown, makes a running joint at its forward end with the stationary member 2 constituting the outer wall of the extrusion chamber 3. The thread 4 on the cylinder 1 is a right hand thread and co-operates with a left hand thread 5 on the inner stationary member 6. The cylinder rotates in a clockwise direction, looking in the direction of the arrow A, and impels plastic metal in a left hand direction into the extrusion chamber 3 from which it passes between the replaceable inner and outer dies, 7 and 8 respectively, to form a tube. The stationary member 6 and die 7 are hollow to provide a tubular opening 9 for the passage therethrough of an insulated cable or other elongated body to be provided with an extruded metal sheath. Referring now to Figure 1 only, it will be seen that the forward end 10 of the cylinder 1 is formed as a cylindrical socket and the rear end of the stationary member 2 is formed as a spigot 11. The inner surface of the socket is provided with a left hand thread 12 of short pitch, the thread being of buttress section. The outer surface of the spigot 11 is provided with a right hand thread 13 of which the shape and pitch correspond to that of the thread 12. The depth of the thread in each case is large in comparison with the clearance between the adjacent faces of the two sets of threads.

In the apparatus shown in Figures 2 and 3 the end of the cylinder 1 makes a joint in a radial plane with the rear end face of the stationary member 2. The counter-pressure building device for the joint comprises a series of spiral ribs 15 on the end face of the cylinder 1 which run in a clockwise direction when seen as in Figure 3. The end face of the stationary member 2 is also furnished with a corresponding number of spiral ribs 16 running in a counter direction. In both cases the ribs are formed by cutting in the face of each member small spiral grooves 17 which are of constant width and rectangular in cross-section. It will be recognized that the ribs 15 and 16 are equivalent to multi-start square threads on cylindrical joint surfaces. This is readily apparent if a series of joints are considered, ranging from a cylindrical joint, through conical joints of increasing angle, to a radial surfaced joint.

Figure 4 shows a modification of the arrangement shown in Figure 3, in which the ribs approximate to a spiral form. This form is simpler to produce since the ribs 25 and 26 are formed merely by cutting in the faces of the members straight grooves 27 which are tangential to the thread 4 on the rotating cylinder 1.

In seeking an explanation of the device it may be considered that the plastic metal which penetrates between the members forms there a thin nut mounted on the thread of the rotating member and engaging with the projections on the stationary member. If this nut were of solid metal it would be steadily driven back towards the point at which it entered the joint by the relative rotation of the two parts of the joint. Since however the metal is plastic to some extent the impelling action will not be precisely of this type. The metal will not retain a constant form but will tend to flow under the shearing forces which it experiences so that there will be appreciable slip between "the nut" and the thread. The result will be that the metal is kept in substantial balance between the force driving it into the joint and the impelling action pushing it out of the joint.

To make the joint more effective a cooling influence may be applied in the region of the joint so as to take away heat from the plastic metal therein and keep it at an appropriate temperature.

It will be appreciated that the temperature of the plastic metal in the joint will be due not only to conduction from other parts of the apparatus but also to generation by the work done in the joint. The cooling influence may be provided by a passage for the circulation of cooling liquid arranged in the stationary member adjacent to the joint surface.

What I claim as my invention is:—

1. A tubular chamber through which under working conditions metal in a highly viscous or plastic state is impelled, comprising two relatively rotatable members together forming a part of the wall of the said chamber, rigid surfaces on the said members making joint with each other in a plane at right angles to the axis of rotation of one of said members, and a metal impelling device formed by providing each of said surfaces with a number of grooves tangential to circles having their centres on the said axis of rotation, the grooves in the one surface intersecting those in the other surface.

2. In a metal extrusion machine in which metal in a plastic state is driven forward by a rotary impelling arrangement into an extrusion chamber and out through a die, a fixed member forming at least part of one wall of the said chamber, a member rotatable relative to said fixed member, a spigot on one of the members, a socket on the other member for receiving the said spigot and making a running joint with clearance therewith, and a device for holding metal in position to close the clearance and continuously exerting during the relative movement of the two members, a pressure equal in magnitude to the extrusion pressure back towards the chamber on plastic metal at the entrance to the running joint, formed by providing the adjacent surfaces of the said socket and spigot with helical grooves of opposite hand.

3. In a metal extrusion machine in which metal in a plastic state is driven forward by a rotary impelling arrangement into an extrusion chamber and out through a die, a fixed member forming at least part of one wall of the said chamber, a member rotatable relative to said fixed member, rigid surfaces on the said members making a running joint with clearance with each other in a plane at right angles to the axis of rotation of the machine, and a device for holding metal in position to close the clearance and continually exerting, during relative movement of the two members, a pressure equal in magnitude to the extrusion pressure back towards the chamber on plastic metal at the entrance to the running joint, said device being formed by providing each of said surfaces with at least one spiral groove, the direction of the groove in the one surface being such that it intersects the groove in the other surface.

4. In a metal extrusion machine in which metal in a plastic state is driven forward by a rotary impelling arrangement into an extrusion chamber and out through a die, a fixed member forming at least part of one wall of the said chamber, a member rotatable relative to said fixed member, rigid surfaces on the said members making a running joint with clearance with each other in a plane at right angles to the axis of rotation of the machine, and a device for holding metal in position to close the clearance and continually exerting during the relative movement of the two members, a pressure equal in magnitude to the extrusion pressure back towards the chamber on plastic metal at the entrance to the running joint, said device being formed by providing each of said surfaces with a number of grooves tangential to circles having their centers on the said axis of rotation, the grooves in the one surface intersecting those in the other surface.

5. In apparatus for extruding a metallic sheath for cables and like articles, a chamber having an extruding orifice and a member for projecting metal through the chamber, means bearing against the chambered member remote from the orifice having a working engagement with a wall of the member and means on each of the co-operating surfaces for holding metal in position within the clearances of the co-operating surfaces to insure a tight joint between the first mentioned means and the chamber wall and for continuously exerting during the relative movement of said first mentioned means and the wall, a pressure equal in magnitude to the extrusion pressure back toward the chamber.

6. In a metal extrusion machine in which metal in a plastic state is driven forward by a rotary impelling arrangement into an extrusion chamber and out through a die, a member forming at least a part of one wall of said chamber, a second member capable of rotary movement relative to the first member and making a running joint with clearance therewith, and means for holding metal in position within the clearance to close the clearance and continuously exerting during the relative movement of the two members a pressure equal in magnitude to the extrusion pressure back towards the chamber on plastic metal at the entrance to the running joint.

7. In a metal extrusion machine in which metal in a plastic state is driven forward by a rotary impelling arrangement into an extrusion chamber and out through a die, a member forming at least a part of one wall of said chamber, a second member capable of rotary movement relative to the first member and making a running joint with clearance therewith, and a device for holding metal in position to close the clearance and continuously exerting during the relative movement of the two members a pressure equal in magnitude to the extrusion pressure back towards the chamber on plastic metal at the entrance to the running joint, said device comprising a rib on one of said members having an impelling surface lying transversely of the joint surface and extending in a direction inclined at an acute angle to the direction of relative movement of the two members and cooperating therewith, projections on the other of said members.

8. In a metal extrusion machine, in which metal in a plastic state is driven forward by a rotary impelling arrangement into an extrusion chamber and out through a die, a member forming at least a part of one wall of said chamber, a second member capable of rotary movement relative to the first member and making a running joint with clearance therewith, and a device for holding metal in position to close the clearance and continuously exerting during the relative movement of the two members a pressure equal in magnitude to the extrusion pressure back towards the chamber on plastic metal at the entrance to the running joint, said device comprising a screw thread on one of said members and cooperating therewith, projections on the other of said members.

9. In a metal extrusion machine in which metal in a plastic state is driven forward by a rotary impelling arrangement into an extrusion chamber and out through a die, a member forming at least a part of one wall of said chamber, a second member capable of rotary movement relative to the first member and making a running joint with clearance therewith, and a device for holding metal in position to close the clearance and continuously exerting during the relative movement of the two members a pressure equal in magnitude to the extrusion pressure back towards the chamber on plastic metal at the entrance to the joint, said device comprising a screw thread on one of said members and cooperating therewith a second screw thread on the other of said members, the two screw threads being of opposite hand.

10. In a machine for the extrusion of plastic metal, a rotating screw thread impelling device constituted by two longitudinally extending concentric members, means for driving one of said members in continuous rotation, a cover member having an extruding orifice applied to the delivery end of said device and making a running joint with clearance with the outer of said concentric members, and a device for holding metal in position to close the clearance and continuously exerting during relative movement of the two members a pressure equal in magnitude to the extrusion pressure back towards the chamber on plastic metal at the entrance to the running joint, said pressure-exerting device comprising a rib on the outer of said concentric members having an impelling surface lying transversely of the joint surface and inclined at an acute angle to the direction of relative movement of said outer member and said cover member and cooperating therewith, projections on the cover member, and said joint being so disposed that the axial component of the thrust exerted on said outer concentric member by the action of said pressure-exerting device opposes the axial component of the thrust exerted on the member by the action of said impelling device.

PERCY DUNSHEATH.